United States Patent
Dahlheimer

(10) Patent No.: US 7,311,307 B2
(45) Date of Patent: Dec. 25, 2007

(54) SEAL SEAT ASSEMBLY WITH SPECIALIZED FEATURES

(75) Inventor: John C Dahlheimer, Laconia, NH (US)

(73) Assignee: Freudenberg-Nok General Partnership, Plymouth, MI (US)

( * ) Notice: Subject to any disclaimer, the term of this patent is extended or adjusted under 35 U.S.C. 154(b) by 0 days.

(21) Appl. No.: 11/239,565

(22) Filed: Sep. 29, 2005

(65) Prior Publication Data

US 2007/0069476 A1    Mar. 29, 2007

(51) Int. Cl.
  *F16J 15/34*    (2006.01)
(52) U.S. Cl. .................... 277/373; 277/372; 277/370
(58) Field of Classification Search ............. 277/358, 277/369–375, 390, 397
  See application file for complete search history.

(56) References Cited

U.S. PATENT DOCUMENTS

| | | | | |
|---|---|---|---|---|
| 2,272,526 A * | 2/1942 | Keeran | ............ | 277/360 |
| 2,806,720 A * | 9/1957 | Meyer | ............ | 277/392 |
| 3,020,052 A * | 2/1962 | Gits | ............ | 277/392 |
| 3,131,956 A * | 5/1964 | Bailey | ............ | 403/26 |
| 3,917,287 A * | 11/1975 | Metcalfe | ............ | 277/374 |
| 4,213,618 A * | 7/1980 | Thurber | ............ | 277/373 |
| 4,415,167 A * | 11/1983 | Gits | ............ | 277/373 |
| 5,199,719 A * | 4/1993 | Heinrich et al. | ............ | 277/374 |
| 6,007,069 A * | 12/1999 | Sadowski | ............ | 277/374 |
| 6,568,686 B2 * | 5/2003 | Hadley | ............ | 277/370 |
| 6,679,678 B2 * | 1/2004 | Giesler et al. | ............ | 415/112 |
| 6,962,340 B2 * | 11/2005 | Maruyama | ............ | 277/370 |
| 2002/0096834 A1 * | 7/2002 | Hadley | ............ | 277/358 |
| 2004/0026868 A1 * | 2/2004 | Dahlheimer | ............ | 277/352 |

* cited by examiner

*Primary Examiner*—Patricia Engle
*Assistant Examiner*—Gilbert Lee
(74) *Attorney, Agent, or Firm*—Harness, Dickey & Pierce, P.L.C.

(57) ABSTRACT

A seal seat assembly utilizes a positive mechanical drive between a seal seat and the bore of a pump component, which in turn is mounted to and driven by the shaft by means of a positive mechanical engagement therebetween. The grommet accommodates the positive mechanical drive between the seal seat and the pump component. The seal assembly enables a robust, easily assembled three-component sub-assembly of the seal seat, grommet and pump component that can be handled as a single unit, and which easily installs onto, seals with, and becomes rotationally locked to a shaft. The positive engagement features, retaining features and static sealing features are axially aligned to provide an axially-compact seal assembly.

22 Claims, 5 Drawing Sheets

SEAL SEAT ASSEMBLY WITH SPECIALIZED FEATURES

FIELD OF THE INVENTION

The present invention relates to a fluid seal for use in sealing a rotating member. More particularly, to a mechanical face seal having a grommet and seal seat inside a pump component.

BACKGROUND OF THE INVENTION

Mechanical face seal assemblies provide a fluid seal between a housing member and a shaft, one of which is rotating with respect to the other. Typically, the housing is stationary while the shaft is rotating. The mechanical face seal assembly utilizes a seal washer and a seal seat having faces that engage with and seal against one another. Either the seal washer or seal seat is fixed to the stationary member while the other component is rotationally fixed to the rotating member so that the two rotate relative to one another. The seal between the contacting seal washer and seal seat prevents fluid loss between the shaft and the housing.

Mechanical seal assemblies typically have an elastomeric grommet having a rind portion stretched around the outer diameter of the mechanical seal seat for mounting and holding the seal seat into the bore of a pump component, such as a housing or impeller, and to provide frictional rotational drive therebetween. The grommet also provides a static seal between the seal seat and the pump component along with accommodating diametrical tolerances of the seal seat outer diameter and the pump component bore. In such designs, a rear wall portion of the grommet radiates radially inward from the rind portion to hold the grommet onto the seal seat when press-fitting the two components into the pump component bore and to provide a cushion between the back of the seal seat and the bottom of the pump component bore once the seal seat and grommet are pressed home.

A common alternative design is to provide an elastomeric grommet having a rind portion fitted into the inner diameter of a seal seat, for mounting and holding the seal seat onto a shaft (shaft sleeve or shaft extension) of a pump, to provide frictional rotational drive therebetween, to provide static sealing therebetween, and to accommodate diametrical tolerances of the seal seat inner diameter and the pump shaft outer diameter. In such designs, a rear wall portion of the grommet radiates radially outward from the rind portion and serves to hold the grommet onto the seal seat when press-fitting the two components onto the pump shaft and to provide a cushion between the back of the seal seat and a shoulder of a shaft, an impeller or other component fixed to the shaft that establishes the final axial location of the seal seat and grommet on the shaft.

In both of these designs, an increased radial squeeze of the grommet rind portion provides increased frictional rotational drive, static sealing, and tolerance accommodation between the seal seat and the pump component bore or shaft. The increased radial squeeze, however, can compromise ease of installation, distort the seal seat, and/or overstress, dislocate or damage the grommet. Conversely, a decreased radial squeeze of the grommet rind portion provides easy installation, but can compromise frictional rotational drive, static sealing, and tolerance accommodation between the seal seat and pump component bore or shaft. Thus, it would be advantageous to provide a seal seat assembly that provides the desired rotational drive, static sealing and tolerance accommodation while also providing an ease of installation. It would further be advantageous if such a seal seat assembly were axially compact such that the axial space required for the seal seat assembly is reduced and/or minimized.

SUMMARY OF THE INVENTION

A seal seat assembly according to the principles of the present invention utilizes a positive mechanical (as opposed to frictional) drive between a seal seat and the bore of a pump component, such as an impeller or a chopper driver cup (hereinafter simply called pumped component), which in turn is mounted to and driven by the shaft by means of positive mechanical engagement therebetween. The grommet accommodates the positive mechanical drive between the seal seat and the pump component. The various features and functions of the seal seat, grommet and pump component are designed so that each can be configured and/or optimized to perform a primary function and sometimes one or more secondary functions while being essentially free of conflicting requirements found in conventional designs. This unique combination of differing and specialized portions or features enables a robust, easily assembled three-component subassembly of the seal seat, grommet and pump component that can be handled as a single unit, and which easily installs onto, seals with, and becomes rotationally locked to a shaft. The seal seat assembly facilitates the retaining of the seal seat within the pump component. The seal seat assembly furthermore provides an effective static seal between the inner diameter of the seal seat and the outer diameter of the pump shaft or shaft extension, sleeve or other device mounted to the shaft (hereinafter referred to as shaft).

In one aspect of the present invention, a seal seat assembly includes a seal seat having opposite first and second surfaces with inner and outer sidewalls extending therebetween. The first surface is a sealing surface and the inner sidewall defines an inner diameter of the seal seat which is configured to be disposed around a shaft. A flexible grommet is disposed around the seal seat. A first portion of the grommet extends along a portion of the inner sidewall of the seal seat while a second portion of the grommet extends along a portion of the outer sidewall of the seal seat. A third portion of the seal seat extends along the second surface of the seal seat between the inner and outer sidewalls.

In another aspect of the present invention, a seal seat assembly includes a mechanical seal seat having a sealing surface, a flexible grommet disposed around a portion of the seal seat, and a pump component disposed around a portion of the seal seat and the grommet. A retaining feature retains the seal seat and the grommet in the pump component. A positive drive feature rotationally locks the seal seat to the pump component. The retaining feature and the positive drive feature are axially aligned thereby providing an axially-compact mechanical seal assembly.

In yet another aspect of the present invention, the seal seat assembly has positive drive elements on the seal seat and the pump component that rotationally locks the seal seat to the pump component. A portion of a grommet is disposed between the positive drive elements on the seal seat and the pump component.

In still another aspect of the present invention, the seal seat assembly utilizes a retaining feature that is operable to hold the seal seat, the grommet and the pump component together. The retaining feature thereby enables the seal seat, the grommet and the pump component to be moved as a single assembly without coming apart.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
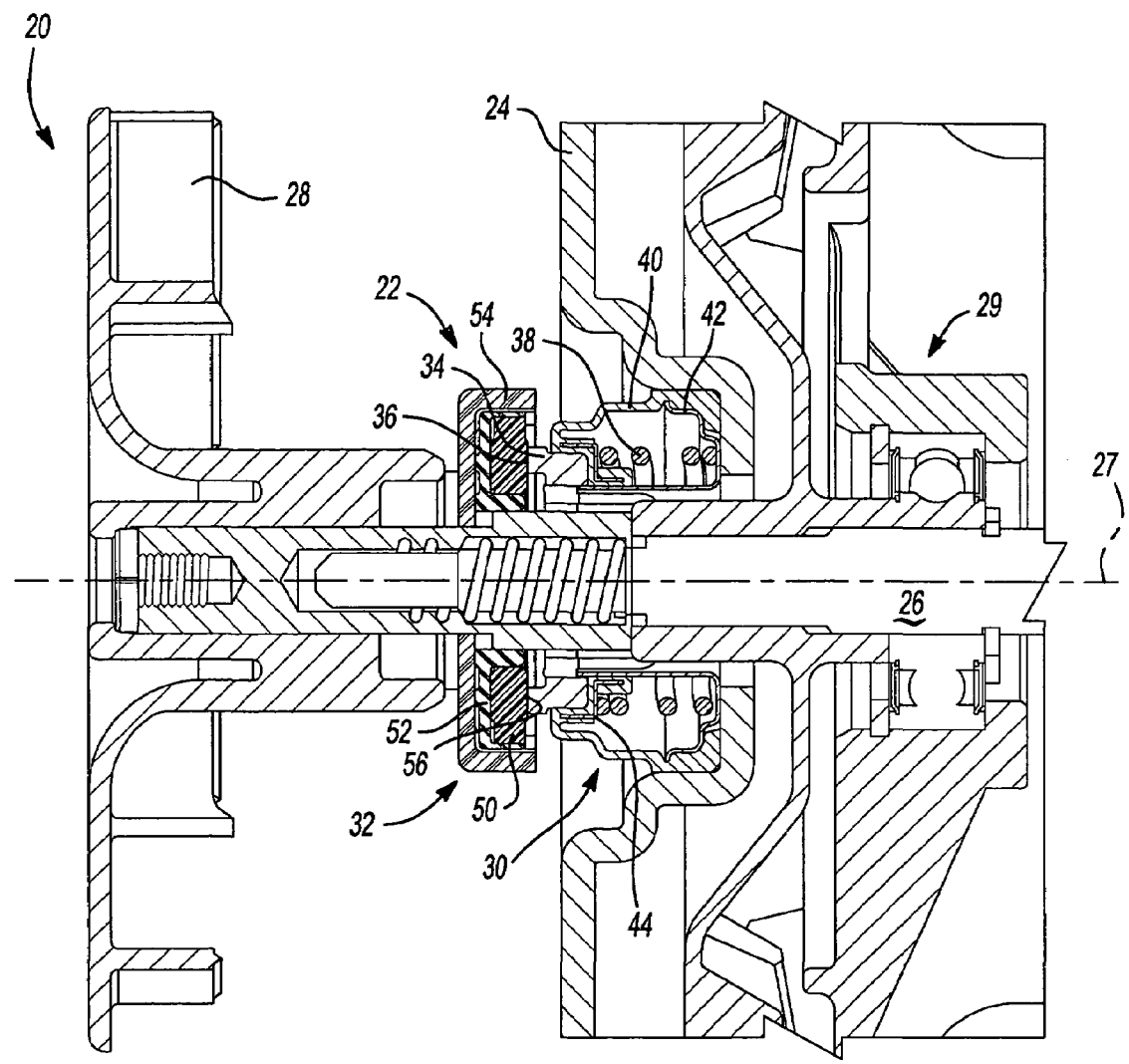
FIG. 1 is a cross-sectional view of an exemplary pump within which a seal seat assembly according to the principles of the present invention can be utilized.

Referring to FIG. 1, a fragmented cross-sectional view of an exemplary pump 20 within which a mechanical face seal assembly 22 according to the principles of the present invention can be utilized is shown. Pump 20 includes a stationary housing plate 24 having an opening therein through which a rotating shaft 26 extends. Shaft 26 rotates about an axial axis 27. An impeller 28 is attached to one end of shaft 26 while the opposite end of the shaft (not shown) is driven by a motor (not shown). A bearing assembly 29 supports shaft 26. Mechanical face seal assembly 22 includes a stationary seal head assembly 30 rotationally fixed to stationary housing plate 24 and a rotating seal seat assembly 32 rotationally fixed to shaft 26, as described in more detail below.

Stationary seal head assembly 30 includes a seal washer 34 having a sealing surface 36. A spring 38 biases seal washer 34 toward rotating seal seat assembly 32. A flexible boot 40 allows axial movement of seal washer 34 enabling it to remain in sealing contact with the seal seat of seal seat assembly 32, and also provides a flexible wall connecting seal washer 34 and a bore provided in stationary housing plate 24 to prevent fluids being sealed within the pump from escaping between seal washer 34 and the stationary housing plate 24. A metal spring seat 42 captures spring 38 within seal head assembly 30, pilots seal washer 34 concentric to the bore provided in stationary housing plate 24, and clamps the larger end of flexible boot 40 outward into the bore provided in stationary housing plate 24 preventing fluid leakage or rotational slippage between the two. A metal insert 44 clamps the smaller end of flexible boot 40 inward around seal washer 34 preventing fluid leakage and rotational slippage between the two.

Rotating seal seat assembly 32 includes a seal seat 50, a flexible grommet 52 and a pump component 54, in this case in the form of a chopper driver cup. Pump component 54 is rotationally fixed to shaft 26, as described below. Grommet 52 forms a static seal against shaft 26, as described below. Seal seat 50 includes a sealing surface 56 that engages with sealing surface 36 on stationary seal washer 34 to form a fluid-tight seal therebetween. The seal formed between seal washer 34 and seal seat 50 and between grommet 52 and shaft 26 prevents the working fluid within pump 20 from flowing past housing plate 24.

Figure 3:
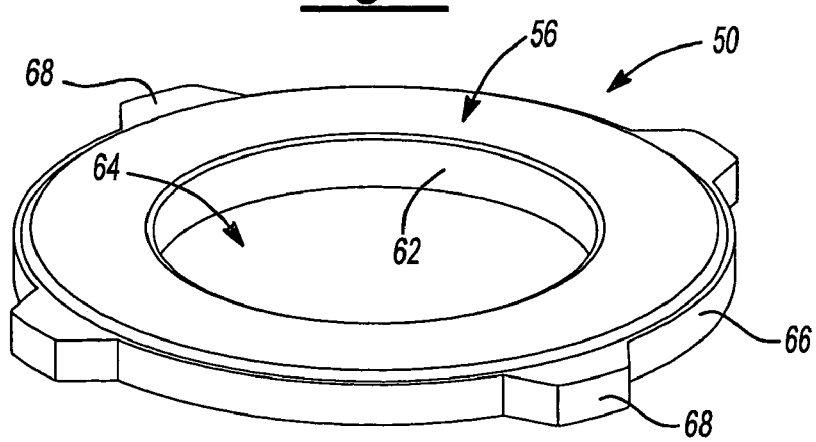
FIG. 3 is a perspective view of a mechanical seal seat utilized in the preferred embodiment of a seal seat assembly according to the principles of the present invention.
Figure 5:
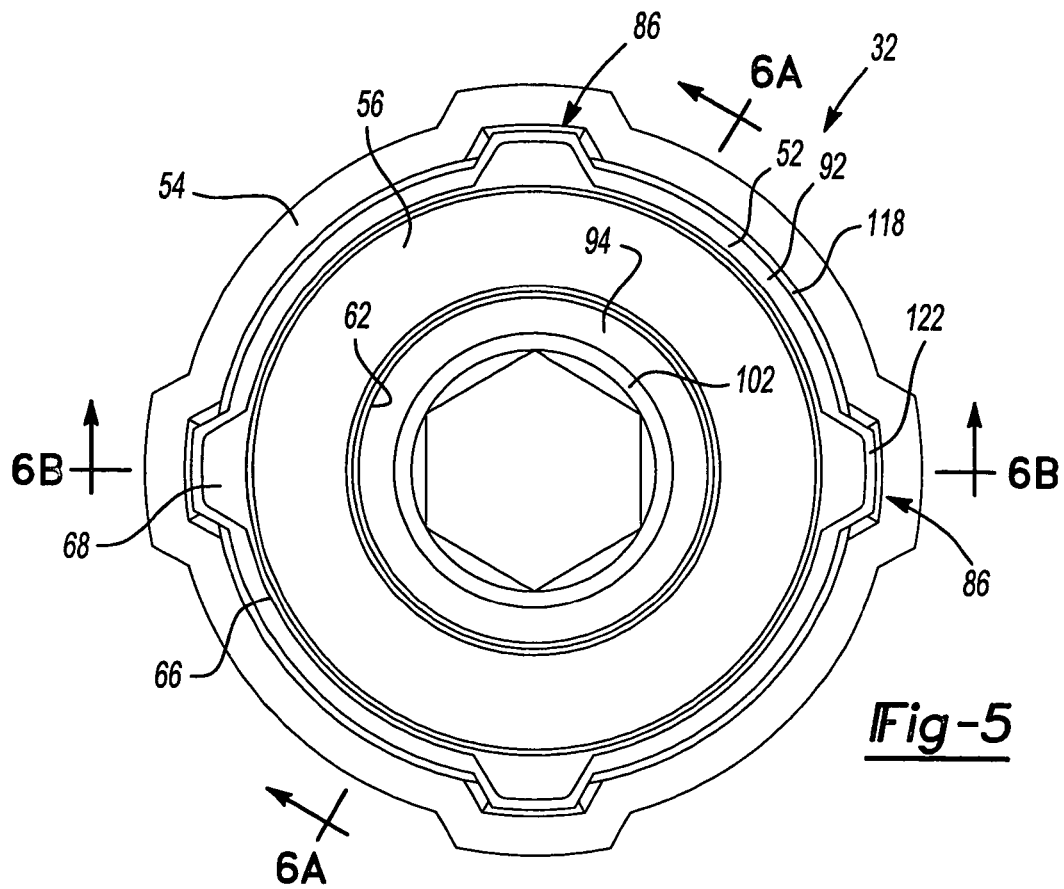
FIG. 5 is a plan view of the preferred embodiment of a seal seat assembly according to the principles of the present invention.
Figure 6A:
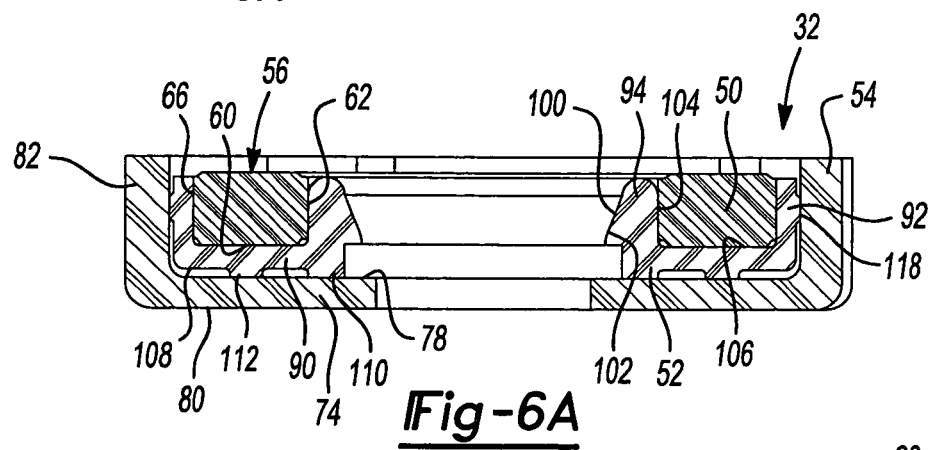
FIGS. 6A and 6B are sectional views of the seal seat assembly of FIG. 5 along lines 6A-6A and 6B-6B, respectively.
Figure 6B:
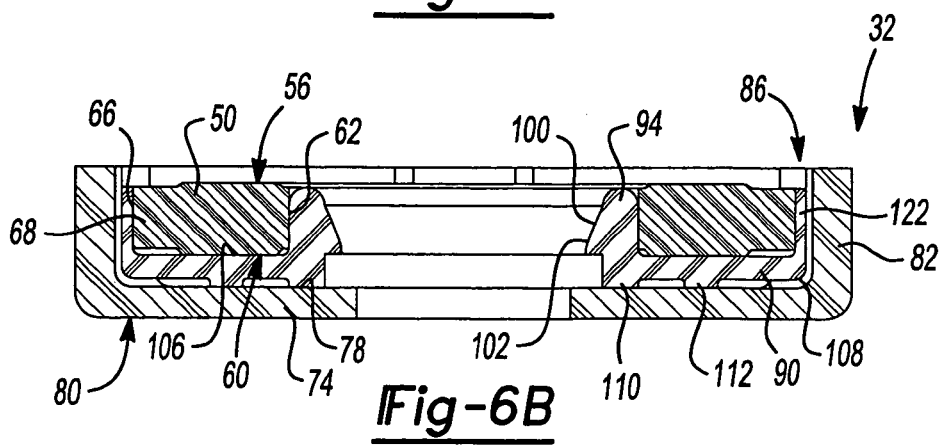
Figure 7:
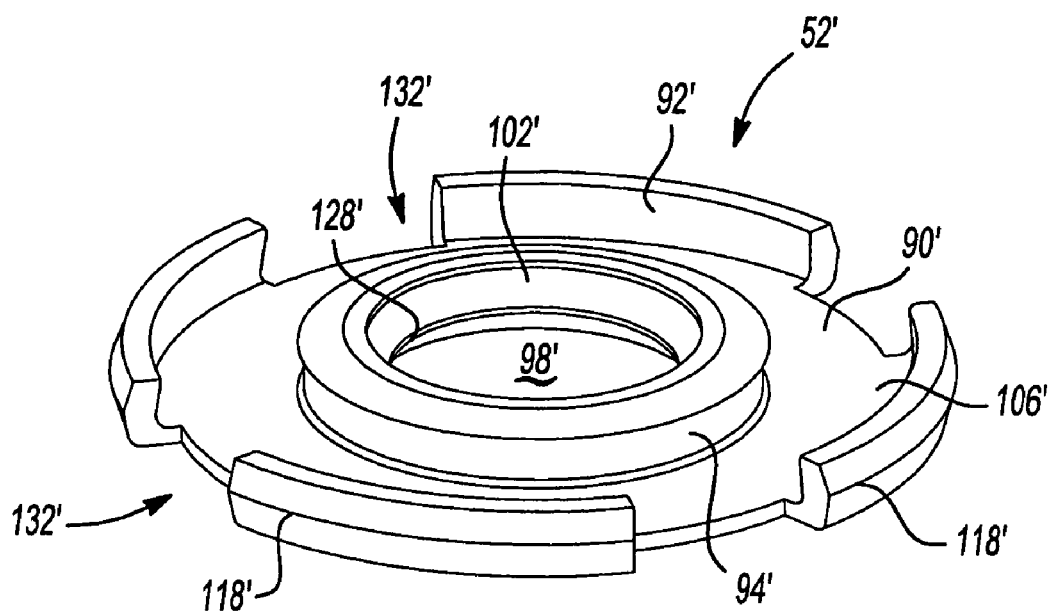
FIG. 7 is a perspective view of a grommet according to an alternate embodiment of a seal seat assembly according to the principles of the present invention.
Figure 8:
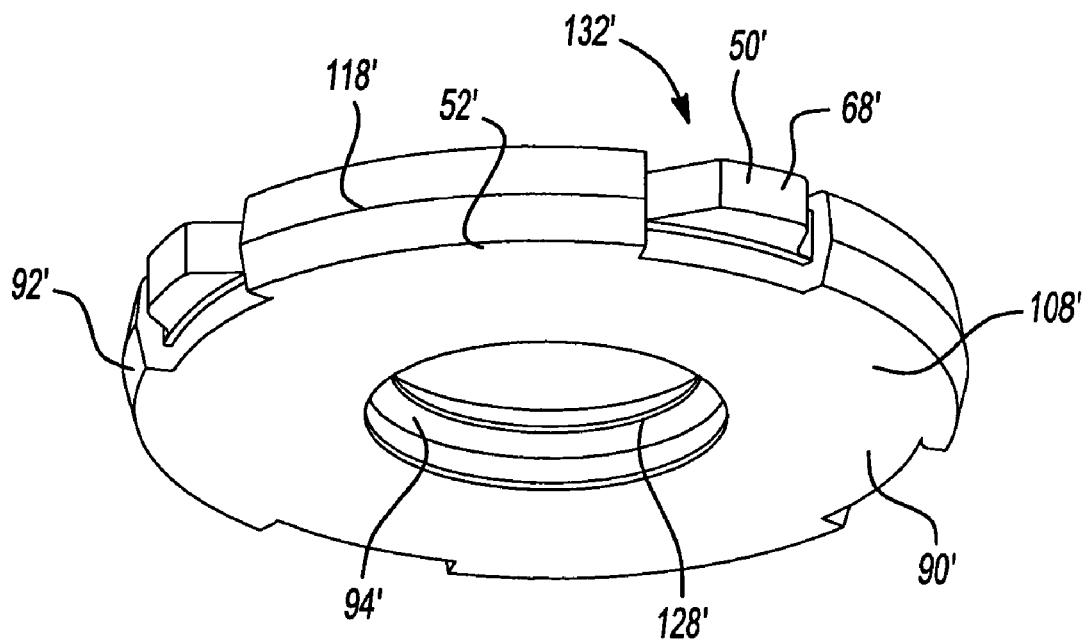
FIG. 8 is a perspective view of a seal seat disposed within the grommet of FIG. 7 utilizing the alternate embodiment of a seal seat assembly according to the principles of the present invention.
Figure 9:
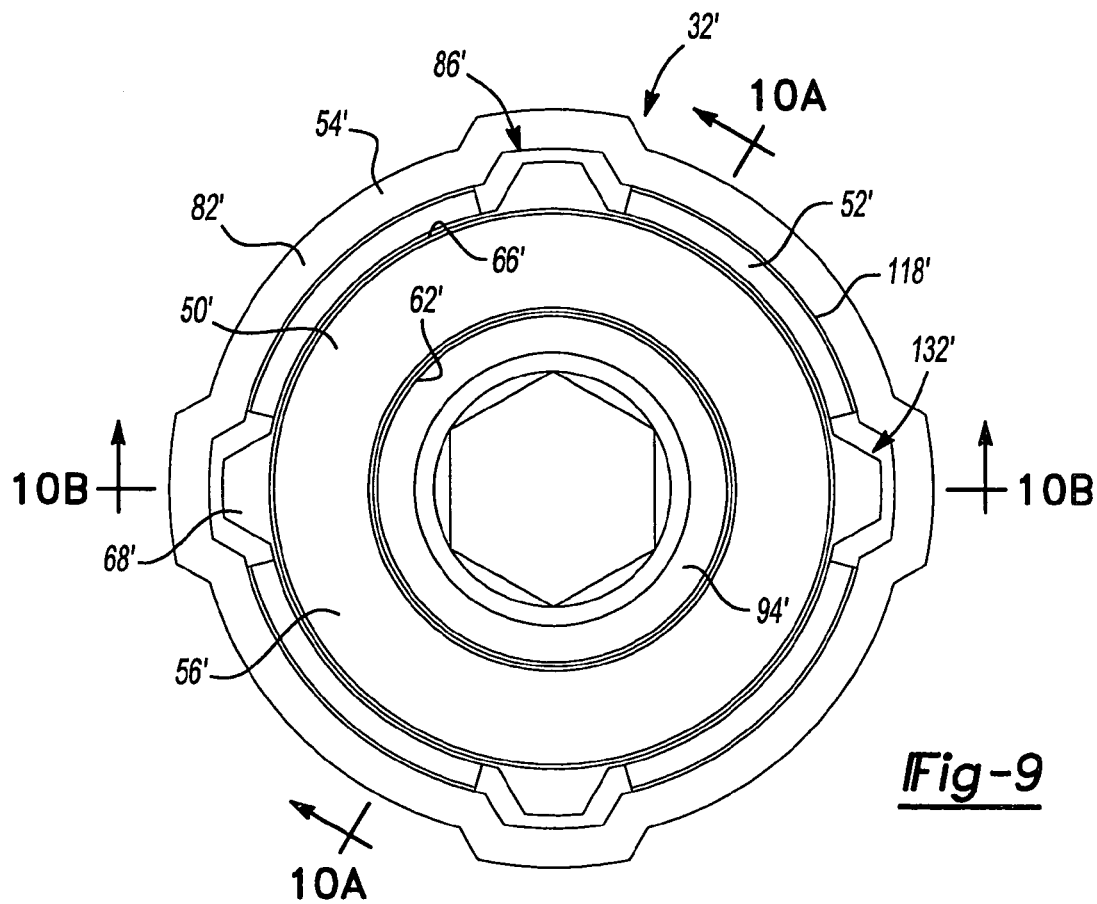
FIG. 9 is a plan view of the alternate embodiment of a seal seat assembly according to the principles of the present invention.
Figure 10A:
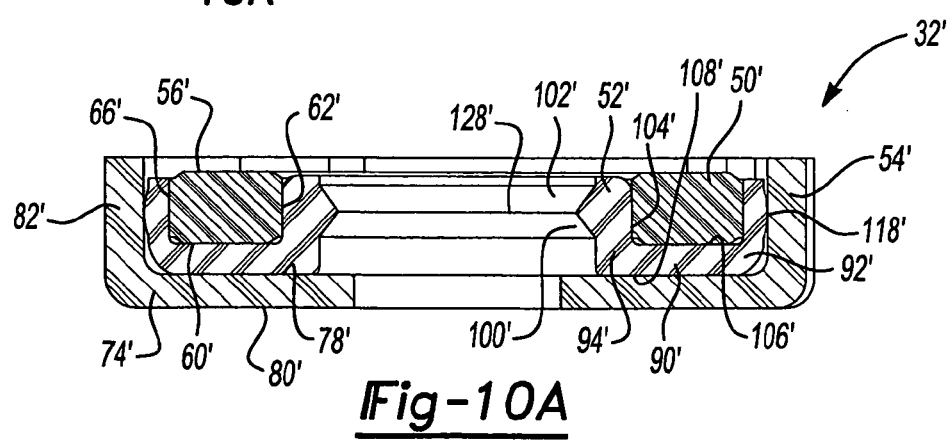
FIGS. 10A and 10B are sectional views of the alternate embodiment of a seal seat assembly of FIG. 9 along lines 10A-10A and 10B-10B, respectively.
Figure 10B:
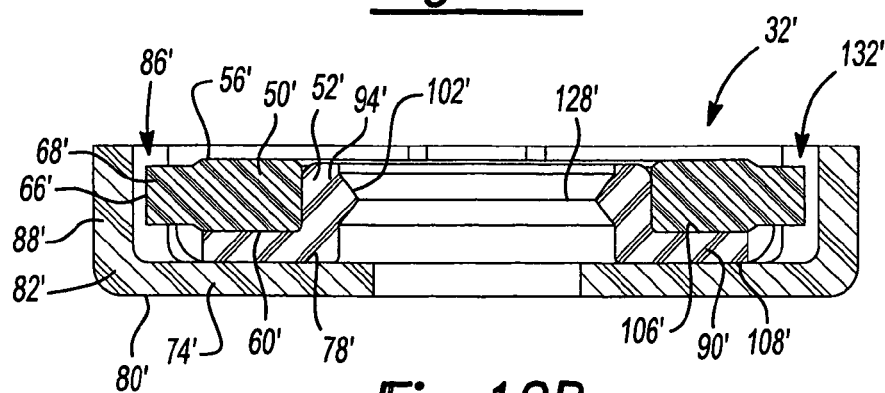

Seal seat 50, as best seen in FIGS. 3, 5 and 6, is generally annular or ring-shaped with axially-opposite surfaces 56, 60. An axially-extending inner sidewall 62 extends between surfaces 56, 60 and defines a central opening 64 configured to receive shaft 26. An outer sidewall 66 extends axially between surfaces 56, 60 and defines an outer periphery of seal seat 50. A plurality of projections or lugs 68 extend radially outwardly along outer sidewall 66. Lugs 68 are positive drive elements that are used to rotationally lock seal seat 50 to shaft 26 via pump component 54, as described below. Sealing surface 56 is lapped and polished to provide a desired surface finish for mating with and sealing against sealing surface 36 of seal washer 34, as known in the art. Seal seat 50 can be made from a variety of materials. For example, seal seat 50 can be made from stainless steel, bronze, ceramic, or silicone carbide. It should be appreciated, however, that other materials can be used to form seal seat 50 as known in the art.

Figure 4:
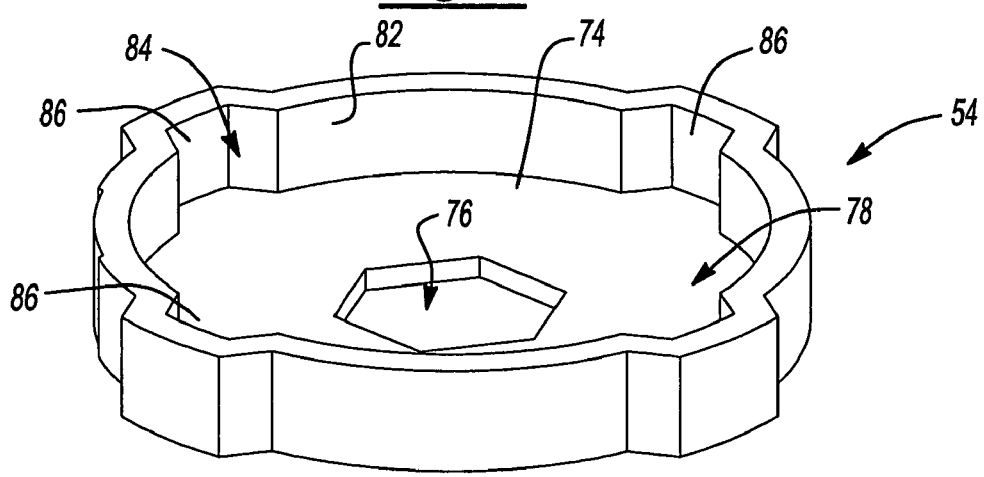
FIG. 4 is a perspective view of a pump component utilized in a preferred embodiment of a seal seat assembly according to the principles of the present invention.

Pump component 54, as best seen in FIGS. 4-6, includes a base 74 with a central opening 76 therein. Central opening 76 is configured to provide a positive engagement with shaft 26 to rotationally-lock pump component 54 to shaft 26. For example, central opening 76 can include one or more flats that are complementary to flats on shaft 26 to provide a rotational lock therebetween. It should be appreciated, however, that other techniques for rotationally locking pump component 54 to shaft 26 can be employed. For example, corresponding keys and slots, tabs and recesses, drive pins and holes, or direct press-fitting, among others, can be employed.

Base 74 has opposite first and second surfaces 78, 80. First surface 78 faces grommet 52 and seal seat 50 when disposed therein. A sidewall 82 extends axially from the outer periphery of base 74. First surface 78 and sidewall 82 thereby form a bore 84 within which grommet 52 and seal seat 50 are disposed. A plurality of radially-extending recesses 86 are disposed along sidewall 82. Recesses 86 are complementary to lugs 68 of seal seat 50. Lugs 68 reside within recesses 86 and provide a positive engagement therebetween that rotationally locks seal seat 50 to pump component 54. Thus, the engagement between lugs 68 of seal seat 50 and recesses 86 of pump component 54 rotationally lock seal seat 50 to shaft 26 via pump component 54. Pump component 54 can be made from a variety of materials. By way of non-limiting example, pump component 54 can be made from a polymer, such as nylon 66, glass-filled polymers, metal, and the like.

Grommet 52 is both resilient and flexible and capable of withstanding the temperatures associated with the mechanical seal. Additionally, grommet 52 is also chemically compatible with the working fluid within pump 20. As such, grommet 52 can be made from a variety of materials. By way of non-limiting example, grommet 52 can be made of nitrile, ethylene propylene, silicone, or fluorocarbon elastomers. It should be appreciated, however, that other materials can be used to form grommet 52.

Figure 2:
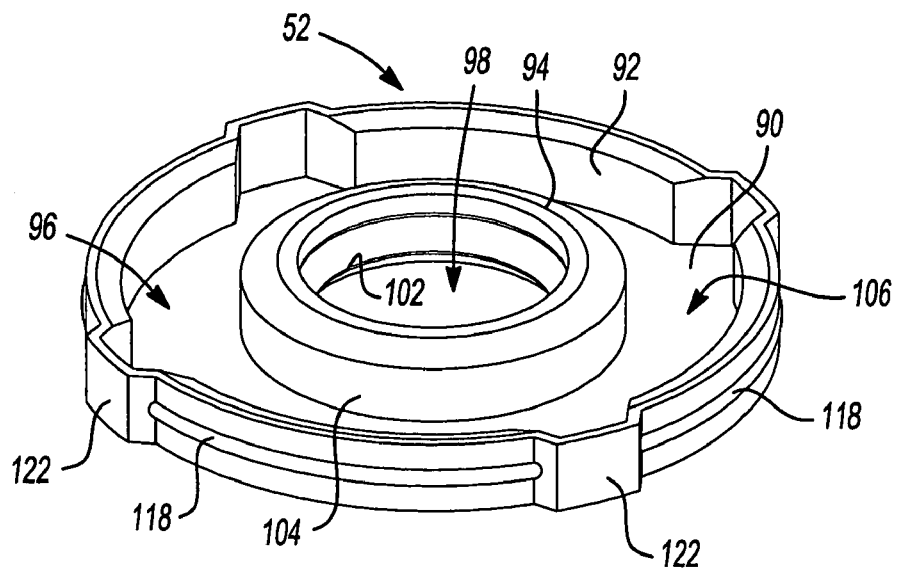
FIG. 2 is a perspective view of the grommet utilized in the preferred embodiment of a seal seat assembly according to the principles of the present invention.

Grommet 52, as best seen in FIGS. 2, 5 and 6, includes an annular or ring-shaped base 90 having an outer sidewall 92 extending axially from the outer periphery thereof and an inner sidewall 94 extending axially from the inner periphery thereof. Base 90, outer sidewall 92 and inner sidewall 94 thereby form a cavity 96 within which seal seat 50 is disposed. Inner sidewall 94 defines a central opening 98 configured to receive shaft 26. The radially inwardly-facing surface 100 of inner sidewall 94 forms a lip seal 102 thereon which provides a static seal against the outer surface of shaft 26. Specifically, inner surface 100 tapers radially inwardly as it extends axially to form lip seal 102. Lip seal 102 thereby prevents working fluid from leaking past seal seat assembly 32 between grommet 52 and shaft 26. The radially outwardly-facing surface 104 of inner sidewall 94 faces inner sidewall 62 of seal seat 50. Inner sidewall 94 thereby prevents direct contact between shaft 26 and inner sidewall 62 of seal seat 50. Inner sidewall 94 is compressed between the outer surface of shaft 26 and inner sidewall 62 of seal seat 50. Inner sidewall 94 thereby facilitates concentric positioning of seal seat assembly 32 on shaft 26 in addition to accommodating variations in diameters, roundness and finishes of both seal seat 50 and shaft 26. Moreover, inner sidewall 94 provides insulation between seal seat 50 and shaft 26 in order to reduce transmission of seal seat frictional heat and noise into shaft 26 and to prevent impact noise between seal seat 50 and shaft 26.

Base 90 includes axially-opposite first and second surfaces 106, 108. First surface 106 faces and engages against surface 60 of seal seat 50. Second surface 108 faces first surface 78 of pump component 54. Base 90 insulates surface 60 of seal seat 50 from base 74 of pump component 54 thereby preventing direct contact and reducing transmission of seal seat frictional heat and noise therebetween.

Second surface 108 includes inner and outer annular ribs 110, 112 that extend axially therefrom and engage first surface 78 of pump component 54. Inner rib 110 is aligned with inner sidewall 94 and primarily functions to maintain the axial location of lip seal 102 inside central opening 64 of seal seat 50 while seal seat assembly 32 is pressed onto shaft 26, thus squeezing lip seal 102 radially between inner sidewall 62 of seal seat 50 and the outer surface of shaft 26. Outer rib 112 provides radially centralized axial support of seal seat 50 and holds seal seat 50 parallel with base 74 of pump component 54. A secondary function of outer rib 112 is to cushion, prevent direct contact, and to provide insulation between seal seat 50 and pump component 54 in order to help maintain the flatness of seal seat 50, reduce transmission of seal seat frictional heat and noise into pump component 54 and to prevent impact noise between seal seat 50 and pump component 54.

The use of inner and outer ribs 110, 112, as opposed to a thicker base 90, to contact first surface 78 of pump component 54 facilitates the insertion of seal seat 50 into grommet 52. The area of base 90 between inner and outer ribs 110, 112 stretches easily to facilitate inserting lip seal 102 into the slightly smaller inner diameter of seal seat 50 formed by inner sidewall 62. If base 90 were axially thicker such that it occupied the axial space defined between the bottom of ribs 110, 112 and first surface 106, the thicker base would be less flexible and less easily stretched, thereby making the insertion of lip seal 102 into inner diameter of seal seat 50 more difficult. Thus, the use of ribs 110, 112 also facilitates the insertion of seal seat 50 into grommet 52.

Outer sidewall 92 includes a plurality of radially outwardly-extending projections or ribs 118 that are radially squeezed between the inner surface of sidewall 82 of pump component 54 and outer sidewall 66 of seal seat 50. Ribs 118 primarily function to prevent grommet 52 and seal seat 50 from falling out of bore 84 of pump component 54 during shipping, handling and installation. Ribs 118 thereby function as retaining features or elements that retain grommet 52 and seal seat 50 within pump component 54. Secondary functions of ribs 118 include facilitating the locating of seal seat 50 concentric with bore 84, to cushion, prevent direct contact, and to provide insulation between seal seat 50 and pump component 54 in order to reduce transmission of seal seat frictional heat and noise into pump component 54, and to prevent impact noise between seal seat 50 and pump component 54.

Outer sidewall 92 also includes a plurality of radially-extending lug pockets 122 which are complementary to lugs 68 of seal seat 50 and recesses 86 of pump component 54. Lug pockets 122 primarily function to envelope lugs 68 extending from seal seat 50 which fit into corresponding recesses 86 of pump component 54 to thereby provide a positive mechanical rotational drive between seal seat 50 and pump component 54. Secondary functions of lug pockets 122 are to pilot lugs 68 into recesses 86 and to surround lugs 68 with conforming elastomeric walls to cushion, to prevent direct contact, and to provide insulation between seal seat lugs 68 and recesses 86 of pump component 54, which reduces the transmission of seal seat frictional heat and noise into the pump component and prevents impact noise between the two.

Ribs 118 and lug pockets 122 alternately share the same axial space or plane. That is, ribs 118 are disposed between lug pockets 122 and are disposed in the same axial plane. Additionally, lip seal 102 is also substantially axially-aligned or substantially disposed on the same axial plane as ribs 118 and lug pockets 122. As such, grommet 52 is axially compact. The axially-compact nature of grommet 52 reduces the overall axial size of seal seat assembly 32. That is, by axially positioning the positive drive elements or features, the retention features, and the static sealing features, in substantially a same axial plane, the resulting axial length of seal seat assembly 32 can be reduced and result in a compacted seal assembly. This, in turn, minimizes the axial space required within pump 20 that is to be occupied by seal seat assembly 32. Additionally, the reduced size also reduces the cost as less material is being used to form seal seat assembly 32.

Referring now to FIGS. 7-10, components of an alternate embodiment of a rotating seal seat assembly 32' are shown. In this alternate embodiment, seal seat 50' and pump component 54' are essentially the same as discussed above with reference to the preferred embodiment. As such, seal seat 50' and pump component 54' will not be described in detail.

Grommet 52', however, is different from that used in the preferred embodiment. In this alternate embodiment, lip seal 102' is different. Specifically, lip seal 102' is generally triangular in cross-section and has two radially-inwardly tapering sections that extend axially and meet to form an engaging edge 128' that engages with the outer surface of the shaft. Lip seal 102' is generally symmetrical about a radially-extending plane that extends through edge 128'.

Grommet 52' also utilizes a different shape for ribs 118' on outer sidewall 92'. Specifically, ribs 118' are generally more pointed and less rounded than that of the preferred embodiment. Ribs 118', however, still perform essentially the same primary and secondary functions discussed above.

In the alternate embodiment, outer sidewall 92' does not include lug pockets therein. Rather, lug windows or voids within outer sidewall 92' are utilized. Lug windows 132' allow lugs 68' on seal seat 50' to extend into recess 86' of pump component 54' without having portions of grommet 52' disposed therebetween. With this configuration, a positive mechanical rotational drive between seal seat 50' and pump component 54' is still achieved. However, grommet 52' does not prevent direct contact between lugs 68' and recesses 86' and, as a result, does not provide as thorough a cushion or insulation therebetween.

Another difference in grommet 52' according to the alternate embodiment is in base 90'. Specifically, base 90' is axially thicker and does not include inner and outer ribs on second surface 108'. Rather, the increased axial thickness of base 90' allows the entirety of second surface 108' to contact first surface 78' of pump component 54'. Base 90' thereby provides substantially the same primary and secondary functions as ribs 110, 112. The increased axial thickness of base 90', however, will make it more difficult to insert lip seal 102' into the inner diameter of seal seat 50' than on the preferred embodiment due to the increased relative thickness.

Thus, a seal seat assembly according to the principles of the present invention provides a superior grommet for accommodating a positive mechanical (as opposed to frictional) drive between a seal seat and the bore of a pump component, this pump component, in turn, being mounted to and driven by a shaft. The grommet also provides a method for mounting and retaining the seal seat within the pump component in addition to providing an effective static seal between the inside diameter of the seal seat and the outer diameter of the shaft or shaft extension, sleeve or other device mounted to the shaft. The grommet also envelopes the outer diameter, back surface and inner diameter of the seal seat with adjoining distinctive portions, each optimized to perform a primary function and sometimes one or more secondary functions. The functions are essentially free of conflicting requirements found in conventional designs. This unique combination of differing and specialized portions enables a robust, easy assembled three-component subassembly of seal seat, grommet and pump component that can be handled as a single unit, and which easily installs onto, seals with and becomes rotationally locked to the shaft. The present invention also provides an axially-compact seal assembly wherein the grommet has retention portions and positive drive accommodation portions that alternately share the same axial space on the outer diameter of the grommet. Additionally, these portions are confined within the same axial space as the lip seal on the inner diameter of the grommet thereby providing an axially compact seal assembly.

While the present invention is shown with reference to specific embodiments, it should be appreciated that variations and changes to these embodiments can be made without departing from the spirit and scope of the present invention. For example, the specific shape of the seal lip, retaining elements or features and the positive drive elements or features can be alternated from that shown. One possibility is the pump component utilizing drive lugs that fit within corresponding recesses in the seal seat to provide the positive drive between the seal seat and pump component. Furthermore, the number of positive drive elements can be increased or decreased depending on the needs of the application. Another possibility is using a plurality of axially-extending projections arranged along surface 108 of grommet 52 in lieu of annular inner and outer ribs 110, 112. These projections can be arranged in a desired pattern or formation and may also facilitate the insertion of lip seal within the central opening 64 of seal seat 50. Thus, the preceding description of the invention is merely exemplary in nature and variations that do not depart from the gist of the invention are intended to be within the scope of the invention. Such variations are not to be regarded as a departure from the spirit and scope of the invention.

What is claimed is:

1. A seal seat assembly comprising:

a seal seat having opposite first and second surfaces with inner and outer sidewalls extending therebetween, said first surface being a sealing surface, said inner sidewall defining an inner diameter of said seal seat configured to be disposed around a shaft; and a flexible grommet disposed around said seal seat, a first portion of said grommet extending along a portion of said inner sidewall of said seal seat, a second portion of said grommet extending along a portion of said outer sidewall of said seal seat, and a third portion of said grommet extending along said second surface of said seal seat between said inner and outer sidewalls, wherein said portions of said grommet are in direct contact with said seal seat and said seal seat has a plurality of lugs radially extending from said outer sidewall and said second portion of said grommet has a plurality of through openings through which said lugs extend.

2. The seal seat assembly of claim 1, wherein said first portion of said grommet is a first axially extending annular sidewall that extends along an entire circular portion of said inner sidewall of said seal seat, said second portion of said grommet is a second axially extending sidewall, and said third portion of said grommet is a radially extending portion having an inner periphery from which said first portion extends and an outer periphery from which said second portion extends and said third portion extends along an entirety of said second surface of said seal seat between said inner and outer sidewalls of said seal seat.

3. The seal seat assembly of claim 1, wherein said third portion of said grommet extends along an entirety of said second surface of said seal seat between said inner and outer sidewalls.

4. The seal seat assembly of claim 1, wherein said third portion of said grommet has an annular section of reduced thickness thereby facilitating the insertion of said seal seat into said grommet.

5. The seal seat assembly of claim 1, wherein said first portion of said grommet extends along an entirety of said inner sidewall of said seal seat between said first and second surface.

6. The seal seat assembly of claim 1, wherein said second portion of said grommet includes a radially outwardly extending rib that extends circumferentially along portions of said grommet between said through openings.

7. The seal seat assembly of claim 6, wherein said ribs and said openings are alternately spaced circumferentially around said grommet.

8. A seal seat assembly comprising:
a mechanical seal seat having a sealing surface;
a flexible grommet disposed around a portion of said seal seat;
a pump component disposed around a portion of said seal seat and said grommet;
a retaining feature axially retaining said seal seat and said grommet in said pump component, said retaining feature including a radially extending rib on said grommet that is compressed between said seal seat and said pump component; and
a positive drive feature rotationally locking said seal seat to said pump component,
wherein said retaining feature and said positive drive feature are axially aligned and are separate and distinct features.

9. The seal seat assembly of claim 8, wherein said retaining feature and said positive drive feature alternately share a same axial space.

10. The seal seat assembly of claim 8, wherein said radially extending rib is one of a plurality of radially extending ribs that extend circumferentially around portions of said grommet.

11. The seal seat assembly of claim 10, wherein said radially extending ribs extend circumferentially along said grommet between said positive drive feature.

12. A seal seat assembly comprising:
a mechanical seal seat having a sealing surface;
a flexible grommet disposed around a portion of said seal seat;
a pump component disposed around a portion of said seal seat and said grommet;
a retaining feature axially retaining said seal seat and said grommet in said pump component; and
a positive drive feature rotationally locking said seal seat to said pump component, wherein:
said retaining feature and said positive drive feature are axially aligned and are separate and distinct features;
said seal seat has opposite first and second surfaces with axially extending inner and outer sidewalls extending therebetween, said first surface being said sealing surface;
said pump component has an axially extending sidewall;
said grommet has an axially extending outer sidewall surrounding a portion of said outer sidewall of said seal seat between said seal seat and said sidewall of said pump component;
said retaining feature includes a plurality of resilient projections extending radially outwardly from said grommet outer sidewall that are squeezed between said seal seat outer sidewall and said pump component sidewall to thereby retain said seal seat and said grommet within said pump component; and
said positive drive feature includes a plurality of radially extending recesses and a plurality of complementary radially extending lugs disposed in and engaged with said recesses to thereby rotationally lock said seal seat to said pump component.

13. The seal seat assembly of claim 12, wherein said plurality of lugs extend radially outwardly from said outer sidewall of said seal seat and said plurality of recesses extend radially outwardly into said sidewall of said pump component.

14. The seal seat assembly of claim 12, wherein said pump component is configured to be rotationally locked to a shaft, said grommet has an axially extending inner sidewall with an engaging portion that forms a static seal against a shaft to which said pump component is rotationally locked, and said engaging portion is axially aligned with said retaining feature and said positive drive feature.

15. The seal seat assembly of claim 12, wherein a portion of said grommet is disposed between said lugs and said recesses.

16. The seal seat assembly of claim 12, wherein said resilient projections and said radially extending recesses are alternately spaced circumferentially around said grommet.

17. A seal seat assembly comprising:
a seal seat having a sealing surface and at least one positive drive element;
a flexible grommet disposed around a portion of said seal seat and operable to form a static seal; and
a pump component disposed around a portion of said seal seat and said grommet, said pump component including at least one positive drive element,
wherein said positive drive elements on said seal seat and said pump component rotationally lock said seal seat to said pump component and a portion of said grommet is disposed between said positive drive elements on said seal seat and said pump component.

18. The seal seat assembly of claim 17, wherein said grommet prevents direct contact between said positive drive elements on said seal seat and said positive drive elements on said pump component.

19. The seal seat assembly of claim 18, wherein:
said seal seat has opposite first and second surfaces with axially extending inner and outer sidewalls extending therebetween, said first surface being said sealing surface;
said pump component has an axially extending sidewall;
said grommet has an axially extending outer sidewall surrounding a portion of said outer sidewall of said seal seat between said seal seat and said sidewall of said pump component; and
said positive drive elements include a plurality of radially extending recesses and a plurality of complementary radially extending lugs disposed in and engaged with said recesses with said grommet disposed therebetween.

20. The seal seat assembly of claim 19, wherein said plurality of lugs extend radially outwardly from said outer sidewall of said seal seat, said plurality of recesses extend radially outwardly into said sidewall of said pump component, and said grommet outer sidewall is disposed between said lugs and said recesses.

21. The seal seat assembly of claim 20, wherein said pump component is configured to be rotationally locked to a shaft and said grommet has an axially extending inner sidewall with an engaging portion that forms a static seal against a shaft to which said pump component is rotationally locked.

22. The seal seat assembly of claim 17, wherein said pump component forms a radially outermost portion of the seal seat assembly.

* * * * *